May 29, 1951  J. E. HAWKINS ET AL  2,554,905
SEISMIC SIGNAL AMPLIFIER
Filed June 1, 1946 2 Sheets-Sheet 1
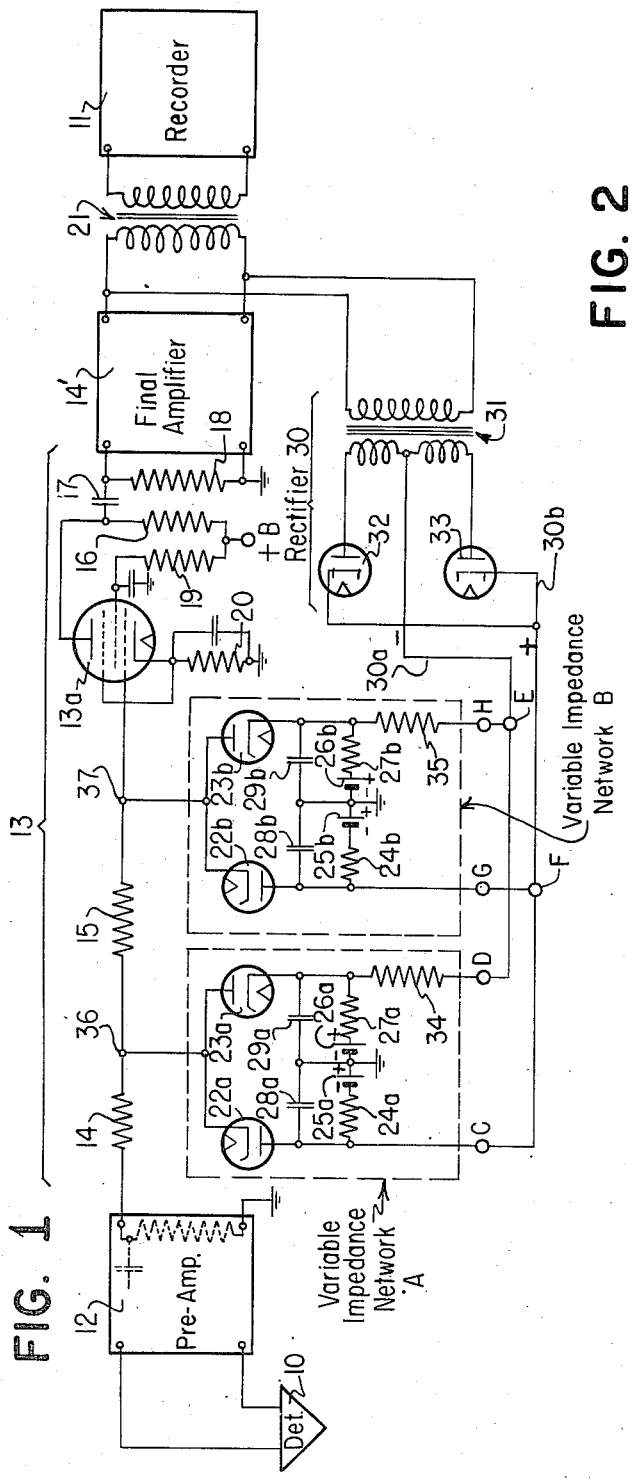
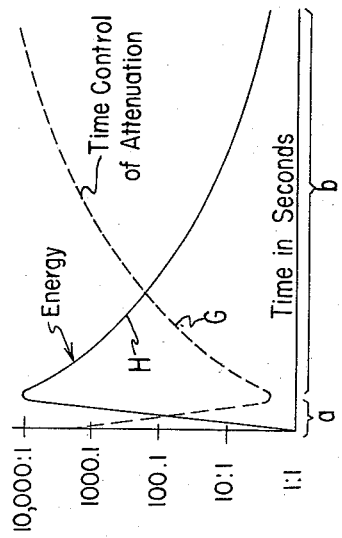
FIG. 2
INVENTORS
James E. Hawkins
Jesse R. Cornett
BY
Mueller and Mason
Attorneys May 29, 1951
J. E. HAWKINS ET AL
2,554,905
SEISMIC SIGNAL AMPLIFIER
Filed June 1, 1946
2 Sheets-Sheet 2
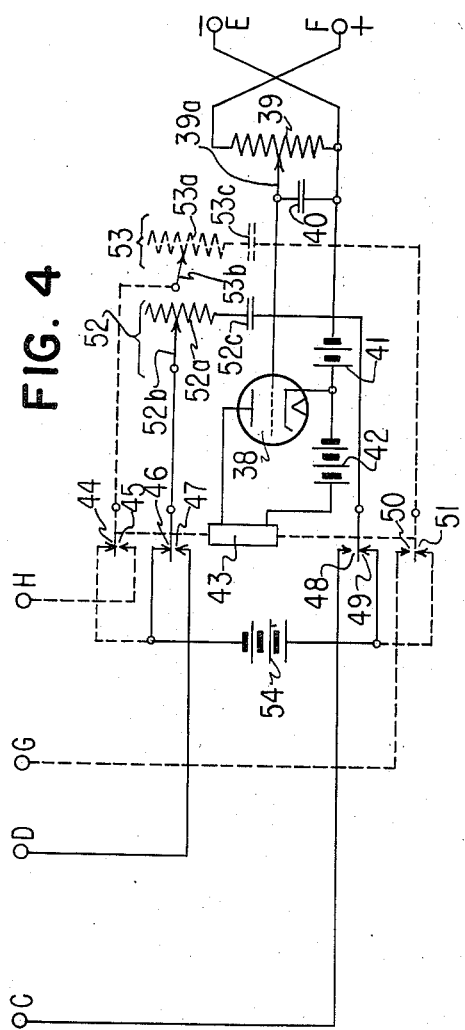
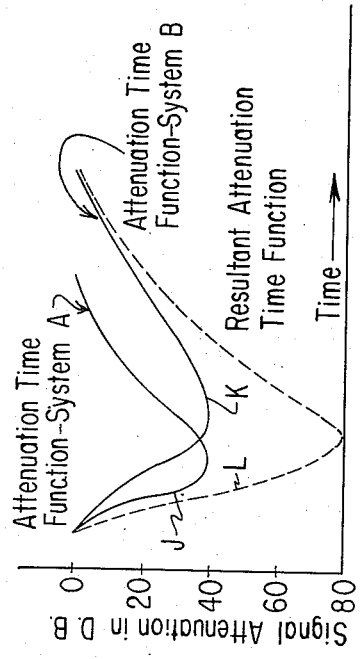
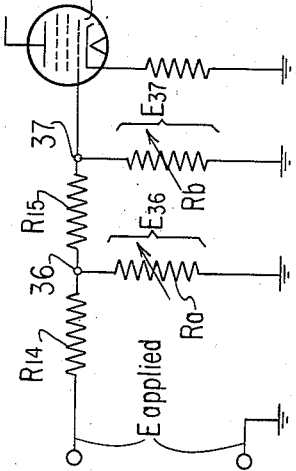
INVENTORS
James E. Hawkins
Jesse R. Cornett
BY
Mueller and Mason
Attorneys Patented May 29, 1951

2,554,905

UNITED STATES PATENT OFFICE 2,554,905

SEISMIC SIGNAL AMPLIFIER

James E. Hawkins and Jesse R. Cornett, Tulsa, Okla., assignors, by mesne assignments, to Seismograph Service Corporation, Tulsa, Okla., a corporation of Delaware Application June 1, 1946, Serial No. 673,744

4 Claims. (Cl. 179—171)

The present invention relates to seismograph systems and more particularly to improved apparatus for varying the gain of seismic signal amplifiers of the type conventionally included in the signal channels used to deliver seismic signals from seismic detectors to a seismic signal recorder.

In seismograph prospecting, seismic waves are generated by detonating an explosive charge in the earth. The seismic waves thus generated are detected at a plurality of points spaced from the shot or detonating point, and the detected waves, following conversion into electrical signals, are amplified and recorded. From the records thus obtained, information may be obtained as to the character of the sub-surface stratigraphy. Specifically, the seismic waves are reflected and refracted at buried strata interfaces and other sub-surfaces of discontinuity, and the points of sub-surface reflection and refraction are shown up by interpretation of the records, so that it is possible to compute from the records the depths and other characteristics of the reflecting or refracting interfaces and the like.

In so-called reflection shooting, the waves as received at the signal detectors include an initial tremor (the first arrival signal), the first break of which, that is the first appearance of wave energy, is often quite weak. Following the first break, a very strong series of waves (transmitted directly to the detectors along the surface-strata of the ground) appear which soon gives way to a series of overlapped and decaying wave trains of progressively lower average amplitude. Thus a typical seismic signal wave pattern includes waves of very high amplitude and waves of very small amplitude. Specifically, the amplitude of the detected waves of a seismic wave train frequently varies over a range of approximately 1,000 to 1 and occasionally varies over a range of 10,000 to 1, during the period of three seconds or more immediately following the shot responsible for generation of the wave train.

Such amplitude ranges are far too great to permit recording of all of the waves at their relative amplitudes as normally encountered in practice. Thus in the ordinary vibratory light beam oscillograph recorder usually used to record seismic signals as wavy traces, if the apparatus and particularly the amplifying equipment is adjusted to bring the width of the trace or the strongest waves within practical limits, then the trace for the first arrival energy and some of the later arrival energy may be of such small amplitude as completely to prevent accurate interpretation thereof. On the other hand, if the apparatus is adjusted to bring the trace portion representing the late arrival energy to a reasonable width capable of accurate analysis, the trace of the strong wave energy is extended beyond the limits of the record strip and hence is of little value.

In practice, two types of gain control systems have been employed in seismic signal amplifiers to obviate the problem outlined above. One of these systems is commonly referred to as the time control system, the name being derived from the fact that in such a system the gain of the seismic amplifier is arbitrarily varied as a function of time. Usually this is accomplished by varying the gain of the amplifier as a function of the charging or discharging time of a condenser network. This type of system is open to the objection that the amplitude patterns of the output signals from a seismic amplifier are not constant in normal seismic recording. Hence, the amplitude pattern of the seismic energy applied to the input side of the amplifier does not usually conform with sufficient accuracy to the time-gain change pattern of the gain control system. In other words, the particular amplitude pattern of any given seismic signal train is not predictable in advance of generation and hence it is impossible to so design a time control system that the time-gain change pattern thereof will provide for optimum recording of the seismic signals.

The second type of gain control system commonly in use is the so-called Automatic Volume Control system, hereinafter abbreviated as an A. V. C. system, in which the amplitude of the seismic signals appearing at the output side of the seismic amplifier is controlled by feeding a portion of the output signal energy into a control network which varies the gain of the amplifier inversely in accordance with the amplitude of the signal output from the amplifier. In general, this type of system tends to hold the seismic amplifier signal output level at a constant value. Conventional systems of this type are characterized by two major defects. First, the usual system does not have sufficient range of control, i. e. gain change range, to handle the exceedingly wide signal amplitude range typifying the usual seismic wave train. Secondly, amplitude distortion is produced due to the fact that the required time constant of the gain control network, as dictated by different portions of a typical seismic signal wave train, is different for the various portions of the train. Thus in order to control the amplitude of the first signals of a normal seismic train, the gain control network should have a short time constant to provide for fast gain change response. On the other hand, the late arriving seismic signals of the train are distorted by the fast gain control action, thus producing amplitude distortion of the recorded transient pulses. Such distortion is undesirable from an interpretational standpoint, particularly in a correlation of the later transient pulses. Amplitude distortion is not as important from an interpretational standpoint for the early arrivals as the later impulses. In any case, some amplitude distortion must be tolerated to keep the early arrivals on the record if all the signals are to be of sufficient amplitude to be analyzed.

It is an object of the present invention, therefore, to provide an improved wide range variable gain seismic signal amplifier in which substantially all of the problems outlined above are obviated.

It is another object of the invention to provide improved gain control facilities for automatically controlling the gain of a seismic signal amplifier, which have an exceedingly wide gain change range and yet are of simple and economical arrangement.

According to a further and more specific object of the invention, the range of gain control is extended by cascading two gain control networks of the variable shunt type at a common point in the signal amplifying channel and by so decoupling the two networks that the overall gain change range approaches a multiple of the individual gain change ranges of the two networks.

In accordance with still another object of the invention, the time constants of the two gain control networks are adjusted by appropriate design thereof to provide for the desired fast and slow gain responses required for proper handling of different portions of a typical seismic signal wave train, and the two networks are independently controlled on different bases, respectively, to provide the desired fast and slow gain control during arrival of the signals occurring at different portions of the train.

The invention both as to its organization and its method of operation, together with further objects and advantages thereof, will best be understood by reference to the specification taken in connection with the accompanying drawings, in which:

Fig. 1 schematically illustrates a portion of a seismograph system including seismic signal amplifying means characterized by the features of the present invention;

Fig. 2 graphically illustrates generally the signal amplitude pattern of a typical seismic wave train and the idealized gain control pattern best suited to handle a signal amplitude pattern of this form;

Fig. 3 illustrates the equivalent of a portion of the gain control circuit embodied in the system shown in Fig. 1;

Fig. 4 illustrates additional control apparatus which may be embodied in the system shown in Fig. 1; and Fig. 5 graphically illustrates typical performance characteristics of the system shown in Fig. 1 when modified to include the apparatus shown in Fig. 4.

Referring now to the drawings and more particularly to Fig. 1 thereof, the portion of the seismograph system there illustrated comprises a seismic signal detector 10 connected to deliver detected seismic signals to one recording element of a seismic signal recorder 11 over a seismic signal amplifier channel which comprises a pre-amplifier stage 12, a variable gain stage 13 and a final amplifier stage 14'. The output terminals of the final amplifier stage 14' are coupled to the driving coil of one of the galvanometer elements in the recorder 11 through an output transformer 21. The detector 10 and seismic signal recorder 11 may be of any desired commercial construction.

In general, the mode of operation of the system as thus far described is well understood by those skilled in the art. Briefly, however, seismic signals generated through detonation of an explosive charge at a point distant from the detector 10 and as transmitted through the earth both directly and through reflection and refraction from buried strata interfaces and the like are picked up by the detector 10, converted into corresponding electrical signals through operation of this detector, amplified through the three amplifier stages 12, 13 and 14' and impressed through the output transformer upon the driving coil of one of the galvanometer elements embodied in the recorder 11. Typically, the energy or amplitude ratio as between the signals picked up by the detector 10 during different portions of the wave train is as shown by the curve H in Fig. 2 of the drawings, wherein seismic signal amplitude is plotted as a function of time in seconds. As there shown, during the first portion of the seismic signal wave train received during the short period $a$ of approximately $\frac{2}{10}$ of a second, the average amplitude of the seismic signals rapidly rises to an exceedingly high value. During the succeeding portion of the train received during the relatively long time interval $b$ of approximately 2.7 seconds, the average amplitude of the signals picked up by the detector 10 gradually decays. It will be understood, however, that the maximum-minimum energy ratio may not always reach the value shown by the curve H, but may fall below or rise above this value depending on the energy in the shot, the transmission characteristics of the media and other factors. Moreover, the energy may not always rise to a maximum and decay along the same curve, although the general pattern of the energy curves for different shots is the same. In order to control the gain through one or more of the three amplifier stages 12, 13 or 14' so that the described wide variation in seismic signal level is effectively reduced at the output side of this amplifier, the gain of the described amplifying system should ideally be changed as an inverse function of the curve H representing the particular seismic wave train to be recorded, i. e., in accordance with the gain-time curve G shown in Fig. 2 of the drawings. This may be approached through the use of the gain control facilities described immediately below and characterized by the features of the present invention.

Briefly, these facilities comprise two variable impedance networks A and B shunting the input circuit of the amplifier tube 13a provided at the variable gain amplifier stage 13. Specifically, the input electrodes, i. e., the inner grid and cathode, of this tube are coupled to the output circuit of the pre-amplifier stage 12 through the cathode biasing resistor 20 and the output impedance element provided in the pre-amplifier stage 12. A voltage dropping resistor 14 and a decoupling resistor 15 are also provided in this input circuit to serve the functions specifically described below. The output electrodes of the tube 13a are coupled to the input electrodes of the first tube in the final amplifier stage 14' through a resistance-capacitance coupling network which comprises two resistors 16 and 18 and a coupling condenser 17. Anode and screen potentials are supplied to the tube 13a from an appropriate direct current source through the resistors 16 and 19, respectively.

The two variable impedance networks A and B are of identical circuit arrangement and hence corresponding circuit components thereof have been identified by the same reference numerals distinguished only by the subscripts a and b. In brief, the network A comprises a pair of oppositely poled diode rectifiers 22a and 23a bridging the input circuit of the amplifier stage 13 (between the point 36 and ground) in series with a biasing circuit which includes resistors 24a and 27a and biasing batteries 25a and 26a paralleled by series connected delay condensers 28a and 29a. The time constant of the biasing circuit in the network A is determined by the resistance values of the resistors 24a and 27a, the capacitance values of the condensers 28a and 29a and the resistance of a series resistor 34 through which a variable bias potential or control voltage is impressed across the circuit in the manner explained below. As will be understood by those skilled in the art, the diode rectifiers 22a and 23a have impedances which vary as a function of the magnitude of current flow therethrough and hence as a function of the bias voltages impressed thereacross. Regarding these rectifiers and their associated biasing circuit as a series network, it will be noted that the batteries 25a and 26a are so poled as normally to prevent current conduction through the space current paths of these rectifiers. Thus normally the variable impedance network A presents a very high shunt impedance across the input circuit of the amplifier stage 13 and more particularly between the point 36 thereof and ground. By suitable choice of the voltages of the biasing batteries 25a and 26a, any desired threshold may be established which must be exceeded by a biasing voltage of opposite polarity before space current flow through the rectifiers 22a and 23a may be started to lower the shunt impedance across the input circuit of the amplifier stage 13. In a similar manner and due to the action of the biasing batteries 25b and 26b included in the biasing circuit for the two diode rectifiers 22b and 23b of the variable impedance network B, the terminal impedance of this network is normally very high and hence the network produces no appreciable shunting effect upon the input circuit of the amplifier stage 13.

For the purpose of overcoming the bias voltages afforded by the batteries 25a, 26a, 25b and 26b to thus effect current flow through the rectifiers when the signal voltage appearing at the output side of the final amplifier stage 14' exceeds a predetermined amplitude, and of thereafter varying the magnitude of current flow through the rectifiers as a direct function of the amplitude of the signal voltage developed at the output side of the amplifier stage 14', a full wave rectifier 30 of entirely conventional circuit arrangement and comprising the two diodes 32 and 33 is coupled to the output side of the amplifier 14' through a rectifier input transformer 31. The variable impedance networks A and B, respectively connected in series with the decoupling resistors 34 and 35, represent parallel shunt loads upon the rectifier 30. As will be evident from the polarity signs applied to the output leads 30a and 30b of the rectifier 30, the rectified signal voltage appearing across these leads is applied to the biasing circuits of the two variable impedance networks in opposition to the bias voltages provided by the biasing batteries respectively provided in these circuits.

Briefly to consider the operation of the described gain control facilities, it will be understood that when a signal voltage representative of the seismic signals of a detected seismic wave train appears at the output side of the final amplifier stage 14', a direct voltage having an amplitude proportional to the amplitude of the signal voltage is developed between the output leads 30a and 30b of the rectifier 30. This voltage is applied through the resistor 34 across the outer terminals of the biasing circuit in the variable impedance network A in opposition of the voltages of the batteries 25a and 26a. It is similarly applied through the resistor 35 across the outer terminals of the biasing circuit in the network B in opposition to the biasing batteries 25b and 26b provided in these circuits. So long, however, as the magnitude of this voltage does not exceed the combined voltages of the batteries 25 and 26 as provided in either network, the rectifiers of the two networks remain nonconductive to prevent any decrease in the shunt impedance across the input circuit of the amplifier stage 13.

Assume now that the voltage appearing across the rectifier output leads 30a and 30b exceeds the combined voltage of the two batteries 25a and 26a. When this occurs, a net voltage is impressed across the series connected rectifiers 22a and 23a with the proper polarity to effect current conduction through these rectifiers. As a consequence, the internal impedances of the rectifiers decrease to produce a corresponding decrease in the impedance between the point 36 and ground. The extent to which the impedances of the rectifiers 22a and 23a are decreased varies as a direct function of the magnitude of current flow therethrough. Thus during a rising signal amplitude period, current conduction through the rectifiers 22a and 23a is progressively increased to effect a progressive decrease in the impedance of the network A and hence the input circuit shunting impedance between the point 36 and ground. Conversely during a period of decreasing signal amplitude, current conduction through the rectifiers 22a and 23a is correspondingly decreased to effect a corresponding increase in the impedance between the point 36 and ground. In a manner entirely similar to that just described, the shunt impedance of the variable impedance network B is varied as an inverse function of the average amplitude of the signal voltage appearing at the output side of the final amplifier stage 14' so long as the amplitude of this signal voltage is greater than the threshold value at which current conduction through the diode rectifiers 22b and 23b is initiated.

The effect of decreasing the impedance of the two networks A and B in the manner just explained is that of decreasing the ratio between the voltage appearing between the point 37 and ground and that appearing across the output terminals of the pre-amplifier stage 12. In other words, the input electrodes of the amplifier tube 13a are robbed of a variable portion of the signal voltage appearing across the output terminals of the pre-amplifier 12. Thus as the impedance of the network A is decreased, the signal voltage drop across the resistor 14 is correspondingly increased relative to the output voltage of the stage 12 to effect a corresponding decrease in the amplitude of the signal voltage appearing between the point 36 and ground relative to the output voltage of the stage 12. Similarly, as the shunt impedance of the network B is decreased, the signal voltage drops across the series resistors 14 and 15 are increased relative to the output voltage of the stage 12 to effect a corresponding relative decrease in the signal voltage appearing between the point 37 and ground. Thus the two networks have the effect of lowering the proportion of the available signal voltage which is impressed between the input electrodes of the tube 13a when the signal amplitude is increased. The converse action obviously occurs when the signal amplitude is decreased.

As indicated above, the resistor 15 functions to so decouple the two networks A and B that the range of control is substantially the product of the ranges individually provided by the two networks rather than the sum of these individual ranges. To this end, the resistor 15 should have a resistance value of the order of one megohm. The effect of this resistor may best be explained by reference to the equivalent circuit shown in Fig. 3 of the drawings wherein the impedances of the networks A and B are represented as variable resistors $R_a$ and $R_b$ (these two networks are substantially purely resistive at frequencies of the order of 50 to 200 cycles) and the resistors 14 and 15 are respectively represented as fixed resistances $R_{14}$ $R_{15}$. From an inspection of this equivalent circuit, it will be apparent that the voltage ratio $$\frac{E_{36}}{E \text{ applied}} = \frac{R_a}{R_{14} + R_a}$$

is controlled by and varies as a function of the impedance $R_a$ of the variable impedance network A. In setting up the relationship between $E_{36}$ and E applied, the branch circuit including the resistances $R_{15}$ and $R_b$ may be neglected due to the fact that the resistance $R_{15}$ is so large (approximately one megohm) relative to the resistance values of the resistors $R_{14}$ and $R_a$ that the branch circuit may be neglected. In other words, the error introduced in the equation by failure to take into account the resistances $R_{15}$ and $R_b$ is entirely negligible. Similarly it will be apparent that the voltage ratio $$\frac{E_{37}}{E_{36}} = \frac{R_b}{R_{15} + R_b}$$

is controlled by and varies as a function of the impedance $R_b$ of the network B. The voltage ratio of the cascaded system is thus:

$$\frac{E_{37}}{E_{36}} \times \frac{E_{36}}{E \text{ applied}} = \frac{R_b}{R_{15} + R_b} \times \frac{R_a}{R_{14} + R_a} \quad (1)$$

$$= \frac{E_{37}}{E \text{ applied}}$$

$$= \frac{R_b R_a}{(R_{15} + R_b)(R_{14} + R_a)}$$

Hence:

$$\frac{E_{37}}{E \text{ applied}} = \frac{R_b R_a}{(R_{15} + R_b)(R_{14} + R_a)} \quad (2)$$

From Equation 2 above, it will be apparent that when $R_a$ and $R_b$ are small as compared with $R_{14}$ and $R_{15}$ respectively, the voltage ratio reduces to:

$$\frac{E_{37}}{E \text{ applied}} = \frac{R_b R_a}{R_{14} R_{15}} = \frac{R_b R_a}{K} \quad (3)$$

Thus the range of the gain change which may be obtained through the action of the two variable impedance networks A and B is determined not by the sum of the impedance changes which may be effected in these networks but by the product thereof. It will be seen, therefore, that by providing the two networks and effectively decoupling the same, one from the other in the manner just explained, an exceedingly wide range of gain control action may be obtained. If desired or necessary, this range may be further extended by providing additional variable impedance networks in shunt with the input circuit of the amplifier stage 13, decoupling the same from each other through the use of additional decoupling resistors 15 and commonly controlling the same from the output leads 30a and 30b of the rectifier 30.

As indicated above, the condensers 28a, 29a, 28b and 29b and the resistors in the biasing circuits of the networks A and B act to determine the rate of gain change resulting from a predetermined rate of signal voltage change at the output side of the final amplifier stage 14'. In other words, these condensers in combination with their encircuited resistors determine the time constants of the respective networks A and B in which they are included. It is also pointed out above that in handling the first arrival signals of a seismic signal wave train, which first arrival signals are of rapidly increasing and large average amplitude, it is desirable to make the time constants of these networks or at least one thereof as short as possible. On the other hand, in handling the reflection or late arrival energy signals of a seismic wave train, which are relatively of a much lower order of magnitude, it is desirable that the two networks A and B or at least one thereof be characterized by a relatively long time constant.

These two desirable characteristics in the gain control action afforded by the described gain control facilities may easily be obtained by assigning to the variable impedance network A, for example, the function of controlling the gain of the amplifier stage 13 only during the period of large signal amplitude traversal of the amplifying channel and by making the variable impedance network B continuously operative to afford gain control throughout the transmission of the signals of a seismic wave train from the detector 10 to the recorder 11. In such case, the capacitance values of the condensers 28b and 29b are selected to impart a relatively long time constant to the variable impedance network B and biasing batteries 25b and 26b of low voltage are provided to establish a low threshold at which the gain control action of the network B may be initiated. Thus this network may be designed to start operating and continue operating so long as signals having amplitudes above a relatively low predetermined value appear at the output side of the amplifier stage 14' and to impart a relatively slow gain change response to this network. In order to render the variable impedance network A active only during reception of the first arrival-large amplitude signals of a seismic wave train, the biasing batteries 25a and 27a are chosen to have voltages substantially greater than the voltages of the batteries 25b and 26b provided in the variable impedance network B. Further to the end that the network A may be exceedingly fast in its response to changes in the amplitude of the large amplitude signal voltages, the condensers 28a and 29a are chosen to have capacitance values relatively much smaller than the capacitance values of the corresponding condensers provided in the network B. Effectively, therefore, the network A functions to change the time constant of the overall gain control circuit during transmission of the large amplitude signals of a seismic wave train through the amplifier to the recorder 11. It will also be apparent that by appropriate selection of the circuit constants of the two networks A and B, a dual control action is obtained which permits effective governing of the signal level at the output side of the amplifier stage 14' throughout the entire period of detection and recording of a seismic wave train of typical character. Three essential functions are thus obtained, viz: (1) the short time constant necessary to effectively control the rapid increase in signal strength at the beginning of a seismic wave train, (2) a wide range of control when it is most needed, i. e., when the high amplitude signals are traversing the signal channel, and (3) a long time constant system is provided at later point in the wave train when the signal energy is small.

If desired, time control of one or both of the variable impedance networks A and B may be used while retaining the advantages of the exceedingly wide gain change range obtained in the manner explained above. For example, the variable impedance network A may be controlled on a time basis to assist in providing the desired signal attenuation during reception of the high amplitude or large energy portion of a seismic wave train, while at the same time utilizing signal control of the second variable impedance network B to control the signal transmission level through the amplifier during reception of the late arrival energy of the train. To this end, the auxiliary circuit apparatus illustrated in full lines in Fig. 4 of the drawings may be used in conjunction with the gain control facilities embodied in the system shown in Fig. 1. To incorporate this apparatus in the gain control circuit of Fig. 1, the straps between the terminals D and E and C and F in the Fig. 1 circuit may be removed, and the terminals C, D, E and F of the Fig. 4 circuit connected to the corresponding terminals of the Fig. 1 circuit.

Briefly considered, the apparatus shown in Fig. 4 comprises a control tube 38 of the triode or thyratron type which is adapted to be controlled by a signal voltage rectified by the rectifier 30 and developed across the potentiometer resistor 39 to effect operation of a switching relay 43 in response to detection of the first arrival energy (first break) of a seismic wave train by the detector 10. Normally the input electrodes of the tube 38 are biased by means of a biasing battery 41 to a threshold point at which the space current flow through the tube and the winding of the relay 43 from the anode current source 42 is just below the value at which the relay 43 will operate. Adjustment of the signal level at which the relay 43 will operate, may be obtained by adjustment of the wiper 39a along the resistor 39 to change the proportion of the rectified signal voltage appearing across the resistor 39 which is impressed between the input electrodes of the tube 38 in oposition to the normal bias derived from the battery 41. A condenser 40 is bridged across the encircuited portion of resistor 39 to prevent too rapid changes in the voltage impressed between the input electrodes of the tube 38 in a manner well understood in the art.

Time control of the impedance network A is obtained by utilizing the discharge current from the condenser 52c included in a timing network 52 to overcome the bias voltages of the batteries 25a and 26a and render the rectifiers 22a and 23a conductive. More specifically, the condenser 52c is normally charged to a predetermined voltage from a charging current source 54 through the contacts 46 and 49 of the relay 43 and the encircuited portion of a potentiometer resistor 52a included in the timing circuit 52. This resistor is equipped with an adjustable wiper 52b which may be shifted to different settings along the resistor 52a to alter the time constant of the network A, within limits, as desired.

Briefly to consider the operation of the auxiliary control equipment shown in Fig. 4 of the drawings, it will be understood that when an amplified seismic signal voltage appears at the output side of the final amplifier stage 14' and is rectified by the rectifier 30, a bias voltage is developed across the resistor 39. The portion of this voltage impressed between the electrodes of the tube 38 opposes the bias of the battery 41 to effect operation of the relay 43. This relay, in operating, opens its contacts 46 and 49 to interrupt the charging circuit for the condenser 52c, and closes its contacts 47 and 48 to complete a circuit through the resistor 34 and the encircuited portion of the resistor 52a for discharging the condenser 52c through the biasing circuits of the variable impedance network A. From an inspection of the drawings, it will be apparent that the voltage across the condenser 52c is applied to the terminals C and D in opposition to the voltages of the biasing batteries 25a and 26a. Accordingly, space current flow through the rectifiers 22a and 23a is initiated to lower the impedance between the point 36 and ground and hence the impedance shunting the input circuit of the amplifier stage 13. As the condenser 52c discharges through the various paths provided in the network A, the shunting impedance of this network first decreases at an exponential rate determined by the time constant of the overall circuit and then increases exponentially in accordance with the same time constant until a point is reached at which the condenser 52c is fully discharged. When this occurs, the biasing batteries 25a and 26a reassume control of the network A to prevent further current conduction through the rectifiers 22a and 23a and thus reestablish the impedance of the network A at its normal value. Obviously, by appropriate selection of the circuit constants embodied in the network A, the capacitance of the condenser 52c, the resistance of the encircuited portion of the resistor 52a and the voltage of the charging current source 54, any desired time constant may be imparted to the network A during the interval when this network is effective partially to control the gain in the amplifier stage 13. Adjustment of the wiper 52b along the resistor 52a is a convenient means of changing this time constant within certain defined limits.

When the seismic wave train ends, the rectified signal voltage developed across the resistor 39 disappears, with the result that normal bias is restored to the input electrodes 38 to effect the release of the relay 43. In restoring, this relay opens its contacts 47 and 48 to disconnect the timing circuit 52 from the impedance network A and closes its contacts 46 and 49 to reestablish the charging circuit for the condenser 52c. Thus the auxiliary control equipment shown in Fig. 4 of the drawings is reconditioned for operation during detection, transmission and recording of the signals making up another seismic wave train.

If a tube 38 of the thyratron type is used, normalizing of the circuit at the end of the seismic wave train may be obtained by momentarily opening the anode current supply circuit for this tube.

Throughout the described operation of the variable impedance network A as effected under the control of the auxiliary equipment shown in Fig. 4 of the drawings, the variable impedance network B is controlled in accordance with the amplitude of the signals appearing at the output side of the final amplifier stage 14' to afford normal automatic gain control in the exact manner explained above. Preferably, in the particular case under consideration, the circuit components of this network are so chosen that the time constant of the network is relatively long, such that the desired slow gain change control is provided during the period when the late arrival or reflection portion of a seismic wave train is being transmitted to the recorder 11. The circuit components determining the time constant of the overall circuit including those of the network A and the circuit 52, on the other hand, are so chosen that the overall circuit has a relatively short time constant, and the bias voltage of the batteries in the network A is such that the network is only effective during the particular period when the high amplitude signals of the train are being transmitted to the recorder 11.

As a further modification of the described system, both of the networks A and B may be controlled on a time basis. To this end, the auxiliary control equipment shown in Fig. 4 of the drawings may be modified to include the additional circuits shown in dash lines. In such case, the straps between the terminals G and F and H and E are also removed and the terminals C, D, E, F, G and H of the auxiliary control equipment shown in Fig. 4 are connected to the corresponding terminals of the network B. The added portion of the circuit shown in Fig. 4 comprises a second timing circuit 53 and additional switching contacts 44, 45, 50 and 51 embodied in the relay 43 for selectively associating this timing circuit with the charging current source 54 and the variable impedance network B. The second timing circuit 53 is identical with the timing circuit 52 in that it comprises a condenser 53c, a potentiometer resistor 53a and a wiper 53b adjustable along the resistor 53a to include a variable portion of this resistor in the condenser charging and discharging circuits. The mode of operation of the timing circuit 53 to control the impedance of the variable impedance network B is exactly the same as explained immediately above with reference to the operation of the timing circuit 52 in controlling the impedance of the network A. Thus the condenser 53c is normally charged from the source 54 through the contacts 44 and 51 of the relay 43. When, however, the relay 43 operates in response to reception of the first part of a seismic wave train, it opens its contacts 44 and 51 to interrupt the charging circuit and closes its contacts 45 and 50 to complete the circuit for discharging the condenser 53c through the network B in the proper direction to effect space current flow through the rectifiers 22b and 23b. Here again, the change in the impedance of the network B as measured between the point 37 and ground varies as a function of the time constant of the overall circuit including the components of this network, the condenser 53c and the encircuited portion of the resistor 53a.

Referring to Fig. 5 of the drawings, the signal attenuation-time curves there illustrated are exemplary of what may be accomplished by dual time control of the networks A and B in the manner just explained. Specifically, the components of the variable impedance network A and its associated time control circuit 52 may be so chosen that the signal attenuation afforded by this network as a function of time during reception of a seismic wave train is accurately represented by the curve J. Similarly, the network B as controlled by the time control circuit 53 may produce signal attenuation in accordance with the curve K. These two networks, acting together, however, produce a resultant signal attenuation-time curve L which, for reasons stated above, approaches the product of the signal attenuation affected by the two networks acting alone. From a comparison of the curve L with the idealized curve G shown in Fig. 2 of the drawings, it will be apparent that reasonable approximation of optimum gain control action may be obtained by using dual time control in the manner explained immediately above.

From the foregoing explanation, it will be understood that by cascading the two variable impedance networks A and B in accordance with the present invention and in the manner explained above and decoupling these two networks through the use of the resistor 15, a system of gain control is obtained which has an exceedingly wide range and hence is admirably adapted for use in seismic signal transmission work. However, the system is entirely flexible in the sense that various combinations of time and automatic controls may be imposed upon either or both of the two networks to provide the exact signal attenuation pattern desired. Moreover, the system is simple in the extreme and requires a relatively small number of standard circuit components.

While there has been described what is at present considered to be the preferred embodiment of the invention, it will be understood that various modifications may be made therein which are within the true spirit and scope of the invention as defined in the appended claims.

We claim:

1. In a signal channel for transmitting low frequency signals and including at least one amplifier stage provided with an input circuit, a pair of variable impedance gain control networks each including a pair of oppositely poled rectifiers having impedances variable as a function of the bias voltages thereacross, a pair of biasing circuits separately included in said networks and separately bridging said pairs of rectifiers across said input circuit, said biasing circuits respectively including voltage sources normally biasing said rectifiers to have predetermined impedances, means decoupling said networks one from the other, whereby each network is rendered substantially independently operative to vary the signal input level to said amplifier stage, signal responsive means coupled to said channel and responsive to signal traversal of said channel for varying the bias voltages across all of said rectifiers to vary the impedances of said rectifiers as an inverse function of the magnitude of signals in said channel, and means independent of said signal responsive means and separately included in said biasing circuits for differently controlling the rate of change of the bias voltages across the rectifiers respectively included in said networks.

2. In a signal channel for transmitting low frequency signals and including at least one amplifier stage provided with an input circuit, a pair of variable impedance gain control networks each including a pair of oppositely poled rectifiers having impedances variable as a function of the bias voltages thereacross, a pair of biasing circuits separately included in said networks and separately bridging said pairs of rectifiers across said input circuit, one of said biasing circuits including a voltage source normally biasing the pair of rectifiers in its network to a predetermined low bias voltage threshold level and the other of said biasing circuits including a voltage source normally biasing the pair of rectifiers in its network to a predetermined high bias voltage threshold level, means decoupling said variable impedance networks one from the other, whereby each network is rendered substantially independently operative to vary the signal input level to said amplifier stage, signal responsive means coupled to said channel and responsive to signal traversal of said channel for developing a bias voltage which varies in amplitude in the same sense as variations in the magnitude of seismic signals in said channel, means for impressing said bias voltage on said networks with the correct polarity to oppose the biases supplied to said rectifiers by said biasing circuits, thereby to render said networks respectively operative to change the signal input level to said amplifier stage as the magnitude of the bias voltage developed by said signal responsive means exceeds said low and high bias voltage threshold levels respectively, and means independent of said signal responsive means and separately included in said biasing circuits for differently controlling the rate of change of the bias voltages across the rectifiers respectively included in said networks.

3. In a signal channel for transmitting low frequency signals and including at least one amplifier stage provided with an input circuit, first and second variable impedance gain control networks each including a pair of oppositely poled rectifiers having impedances variable as a function of the bias voltages thereacross, a pair of biasing circuits respectively included in said networks and separately bridging said pairs of rectifiers across said input circuit, one of said biasing circuits including a voltage source normally biasing the pair of rectifiers in said first gain control network to a predetermined low bias voltage threshold level and the other of said biasing circuits including a voltage source normally biasing the pair of rectifiers in said second gain control network to a predetermined high bias voltage threshold level, circuit means for controlling said first gain control network to render the same slow acting, additional circuit means for controlling said second gain control network to render the same fast acting, means decoupling said networks one from the other, whereby each network is rendered substantially independently operative to vary the signal input level to said amplifier stage, signal responsive means coupled to said channel and responsive to signal traversal of said channel for developing a bias voltage which varies in amplitude in the same sense as variations in the magnitude of the signals traversing said channel, and means for impressing said last-named bias voltage on said networks with the correct polarity to oppose the bias voltages supplied to said rectifiers by said voltage sources, thereby to render said networks respectively operative to change the signal input level to said amplifier stage as the magnitude of the bias voltage developed by said signal responsive means exceeds said low and high bias voltage threshold levels respectively.

4. In a signal channel for transmitting low frequency signals and including at least one amplifier stage provided with an input circuit, first and second variable impedance gain control networks each including a pair of oppositely poled rectifiers having impedances variable as a function of the bias voltages thereacross, a pair of biasing circuits respectively included in said networks and separately bridging said pairs of rectifiers across said input circuit, one of said biasing circuits including a voltage source normally biasing the pair of rectifiers in said first gain control network to a predetermined low bias voltage threshold level and the other of said biasing circuits including a voltage source normally biasing the pair of rectifiers in said second gain control network to a predetermined high bias voltage threshold level, circuit means included in the biasing circuit of said first gain control network to impart a long time constant to the biasing circuit of said first gain control network, thereby to render said first gain control network slow acting, additional circuit means included in the biasing circuit of said second gain control network to impart a short time constant to the biasing circuit of said second gain control network, thereby to render said second gain control network slow acting, means decoupling said networks one from the other, whereby each network is rendered substantially independently operative to vary the signal input level to said amplifier stage, signal responsive means coupled to said channel and responsive to signal traversal of said channel for developing a bias voltage which varies in amplitude in the same sense as variations in the magnitude of the signals traversing said channel, and means for impressing said last-named bias voltage on said biasing circuits with the correct polarity to oppose the bias voltages supplied to said rectifiers by said voltage sources, thereby to render said networks respectively operative to change the signal input level to said amplifier stage as the magnitude of the bias voltage developed by said signal responsive means exceeds said low and high bias voltage threshold levels respectively.

JAMES E. HAWKINS.
JESSE R. CORNETT.

REFERENCES CITED

The following references are of record in the file of this patent:

UNITED STATES PATENTS

| Number | Name | Date |
|---|---|---|
| 2,171,671 | Percival | Sept. 5, 1939 |
| 2,250,559 | Weber | July 29, 1941 |
| 2,295,410 | Kreuzer | Sept. 8, 1942 |
| 2,298,987 | Thomsen | Oct. 13, 1942 |
| 2,312,642 | Herzenberg | Mar. 2, 1943 |
| 2,329,558 | Schebatskoy | Sept. 14, 1943 |
| 2,341,336 | Singer | Feb. 8, 1944 |
| 2,367,049 | Petty | Jan. 9, 1945 |
| 2,383,710 | Chatterjea | Aug. 28, 1945 |
| 2,395,481 | Hoover | Feb. 26, 1946 |
| 2,401,779 | Swartzel | June 11, 1946 |

FOREIGN PATENTS

| Number | Country | Date |
|---|---|---|
| 449,386 | Great Britain | June 25, 1936 |